United States Patent
Nagase et al.

(10) Patent No.: US 8,060,300 B2
(45) Date of Patent: Nov. 15, 2011

(54) NAVIGATION SYSTEMS

(75) Inventors: Kenji Nagase, Okazaki (JP); Hiroshi Tomita, Anjyo (JP); Toshiaki Minami, Okazaki (JP); Takayasu Nakada, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1285 days.

(21) Appl. No.: 11/715,981

(22) Filed: Mar. 9, 2007

(65) Prior Publication Data

US 2007/0213924 A1    Sep. 13, 2007

(30) Foreign Application Priority Data

Mar. 9, 2006 (JP) .................. 2006-063545

(51) Int. Cl.
*G01C 21/00* (2006.01)
(52) U.S. Cl. ........................ 701/209; 180/167
(58) Field of Classification Search .................. 701/200, 701/209, 301, 300, 96, 23–27; 180/167–169; 340/435, 436, 903
See application file for complete search history.

(56) References Cited

U.S. PATENT DOCUMENTS

| 6,044,321 | A * | 3/2000 | Nakamura et al. ............. 701/96 |
| 7,444,241 | B2 * | 10/2008 | Grimm ......................... 701/301 |
| 2003/0033082 | A1 | 2/2003 | Yanagidaira et al. |
| 2005/0246096 | A1 | 11/2005 | Bracht et al. |
| 2006/0009904 | A1 | 1/2006 | Sakashita et al. |
| 2006/0167626 | A1 * | 7/2006 | Hashizume .................... 701/210 |
| 2007/0018801 | A1 * | 1/2007 | Novotny et al. .............. 340/435 |

FOREIGN PATENT DOCUMENTS

| EP | 0 803 853 A1 | 10/1997 |
| EP | 1 491 857 A1 | 12/2004 |
| JP | A-2002-190098 | 7/2002 |
| JP | A 2002-341758 | 11/2002 |
| JP | A-2004-185504 | 7/2004 |
| JP | A-2004-237885 | 8/2004 |
| JP | A-2005-202579 | 7/2005 |

OTHER PUBLICATIONS

Japanese Patent Office, Notification of Reason forRefusal mailed Sep. 14, 2010 in Japanese Patent Application No. 2006-063545 w/Partial English-language Translation.
Japanese Patent Office, Decision of Refusal mailed Nov. 30, 2010 in Japanese Patent Application No. 2006-063545 w/Partial English-language Translation.

(Continued)

*Primary Examiner* — Dalena Tran
(74) *Attorney, Agent, or Firm* — Oliff & Berridge, PLC

(57) ABSTRACT

Systems, methods, and programs, store map data including a roadway network, detect a current position of the vehicle, and detect or receive at lest one of a distance to another vehicle, a speed of another vehicle, and traffic congestion information. The systems, methods, and programs determine whether the vehicle is within a predetermined distance of a passing lane, a climbing lane, or a lane for slower traffic based on the detected current vehicle position and the map data. If the vehicle is within the predetermined distance, the systems, methods, and programs provide guidance regarding the passing lane, the climbing lane, or the lane for slower traffic based on at least one of the distance to the other vehicle, the speed of the other vehicle, and/or the received traffic congestion information.

13 Claims, 6 Drawing Sheets

OTHER PUBLICATIONS

§§ 232.1 and 232.2 of the *MDOT Engineering Policy Guide* (http://epg.modot.mo.gov/index.php?title=232.1_Climbing_Lanes and (http://epg.modot.mo.gov/index.php?title=232.2_Passing_Lanes).

*Wikipedia* article on climbing lanes (http://en.wikipedia.org/wiki/Climbing_lane).

Section 63.3 of Chapter 63 of the *Civil Engineering Handbook* (2003).

M. Kutz, *Handbook of Transportation Engineering*, 2004, pp. 6.41-6.43.

Project Information/Highway Saitama Urban Line w/English-language Translation (http://www.shutoko.jp/efforts/project/saitama/3-2.html).

\* cited by examiner

NAVIGATION SYSTEMS

INCORPORATION BY REFERENCE

The disclosure of Japanese Patent Application No. 2006-063545, filed on Mar. 9, 2006, including the specification, drawings and abstract thereof, is incorporated herein by reference in its entirety.

BACKGROUND

1. Related Technical Fields

Related technical fields include navigation systems, methods, and programs. In particular, related technical fields include systems, methods, and programs for providing guidance regarding traffic lanes when approaching a passing lane, a climbing lane, or a lane for slower traffic.

2. Description of the Related Art

In recent years, navigation systems for enabling a driver of a vehicle to easily navigate to a destination have become very popular. Such a navigation systems detect a current position of the vehicle by means of a GPS receiver, obtain map data corresponding to the current position through a data storage medium such as a DVD-ROM or an HDD, or a network, and display the map on an LCD monitor. The navigation system may provide traffic guidance when the approaching an intersection, a passing lane, a climbing lane, or a lane for slower traffic. Such guidance assists the driver so that the driver can drive comfortably. For example, a navigation apparatus disclosed in Japanese Unexamined Patent Application Publication No. 2002-341758 provides advance traffic lane information to a driver by means of images and/or audio guidance when there is traffic lane information of which the driver should be made aware.

SUMMARY

The navigation apparatus disclosed in Japanese Unexamined Patent Application Publication No. 2002-341758 provides guidance regarding traffic lanes every time the vehicle approaches a climbing lane or a passing lane on the basis of the vehicle position data and map data. However, there are times when the driver may not need such guidance regarding traffic lanes, for example, depending on the situation in which the vehicle travels. That is, it may be unnecessary to provide guidance regarding traffic lanes such as a passing lane, a climbing lane, or a lane for slower traffic when heavy traffic is present because it will be difficult for the driver to change traffic lanes. It may also be unnecessary to provide guidance regarding traffic lanes when traffic is very light (e.g., there is little to no other vehicles on the road) because the driver's vehicle may not obstruct traffic or there is no vehicle to obstruct the driver's vehicle, that is, there is no reason for the driver to change traffic lanes. If the navigation apparatus keeps providing guidance regarding traffic lanes irrespective of the situation (as in Japanese Unexamined Patent Application Publication No. 2002-341758), it may cause the driver to become annoyed or to lose concentration.

Accordingly, various exemplary implementations of the broad principles described herein provide navigation systems, methods, and programs, that may provide guidance regarding a passing lane, a climbing lane, and/or a lane for slower traffic when needed, thereby improving the convenience for a user.

Various exemplary implementations provide navigation systems, methods, and programs, that may store map data including a roadway network, may detect a current position of the vehicle, may detect a distance to another vehicle, may detect a speed of another vehicle, and may receive traffic congestion information. The systems, methods, and programs may determine whether the vehicle is within a predetermined distance of a passing lane, a climbing lane, or a lane for slower traffic based on the detected current vehicle position and the map data. If the vehicle is within the predetermined distance, the systems, methods, and programs may provide guidance regarding the passing lane, the climbing lane, or the lane for slower traffic based on at least one of the distance to the other vehicle, the speed of the other vehicle, and/or the received traffic congestion information.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
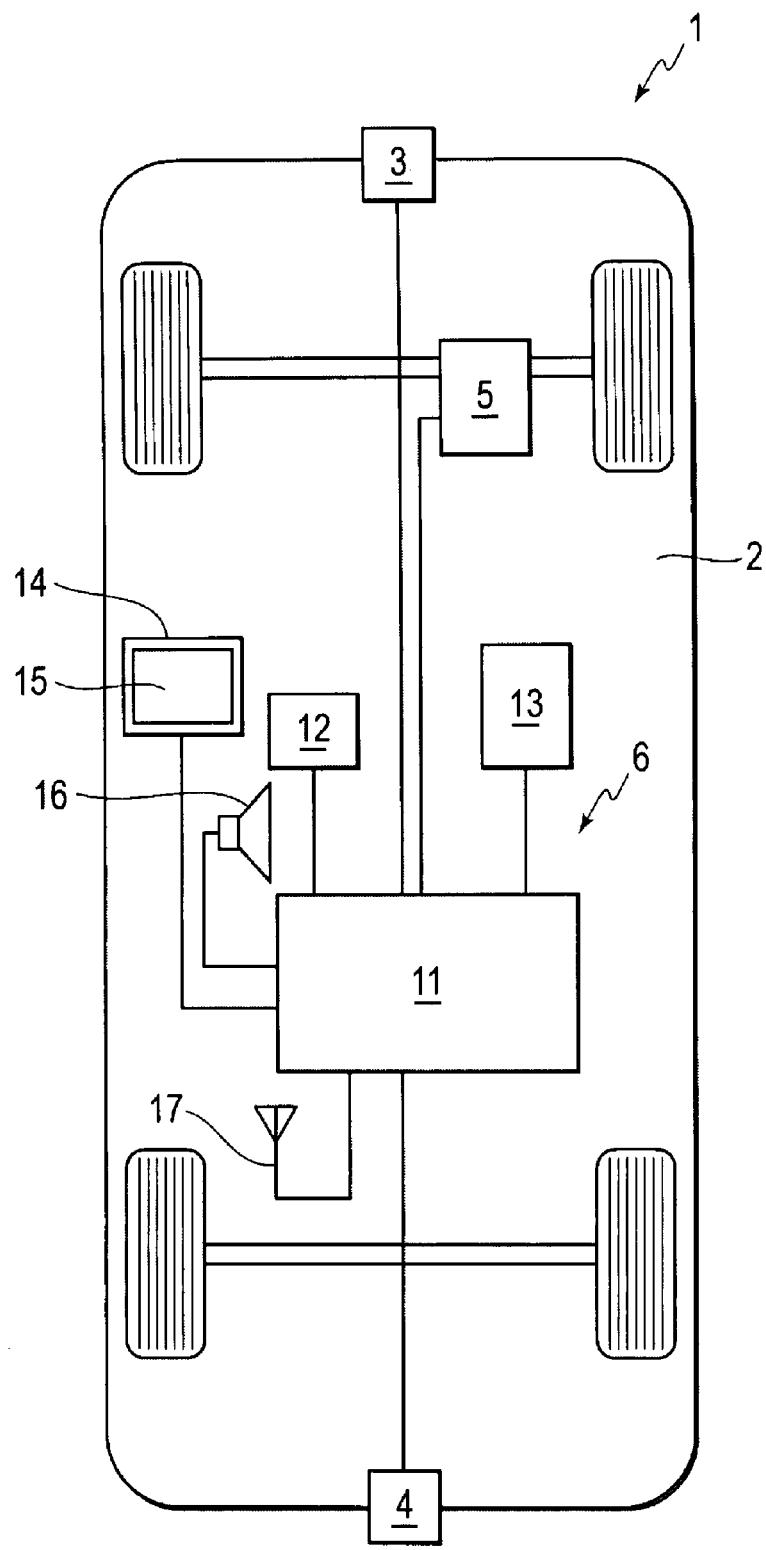
FIG. 1 shows a schematic of an exemplary navigation system.

First, a structural outline of a navigation system 1 will be described with reference to FIGS. 1 and 2. FIG. 1 is a diagram showing the structural outline of the navigation system 1 and FIG. 2 is a functional block diagram showing the navigation system 1 according to the current embodiment.

Figure 2:
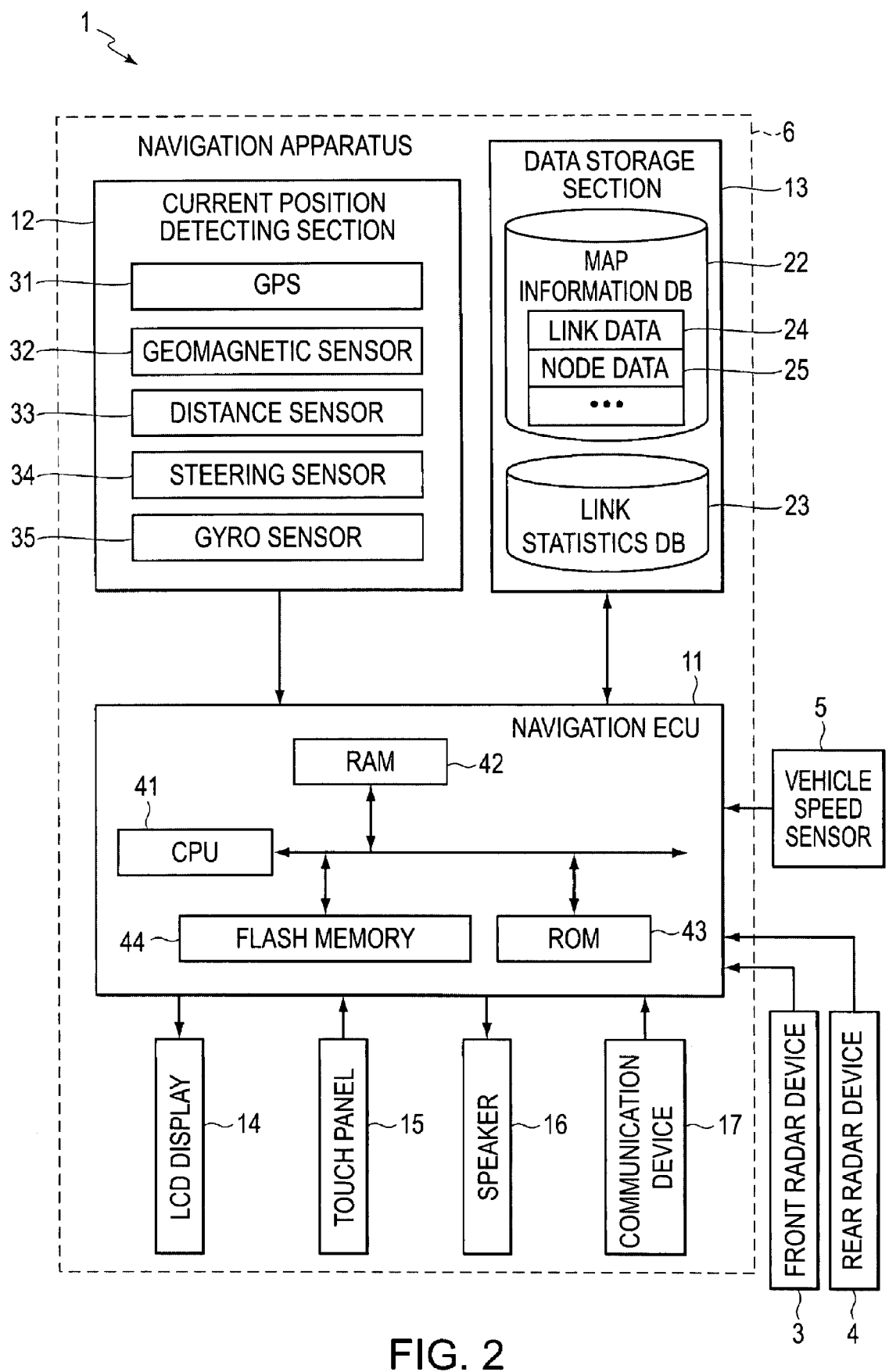
FIG. 2 shows a functional block diagram of an exemplary navigation system.

As shown in FIGS. 1 and 2, the navigation system 1 may include a front radar device 3 that may detect a following distance and a rear radar device 4 that may detect a leading distance. The navigation system 1 may include a vehicle speed sensor 5 and a navigation apparatus 6 that is mounted within the vehicle 2. The navigation apparatus 6 may include a controller (e.g., a navigation Electronic Control Unit (ECU) 11) and a current position detecting section 12, memory (e.g., data storage section 13) that may store map data. The navigation apparatus 6 may include an LCD display 14 that may provide visual guidance, a touch panel 15, a speaker 16 that may provide audio guidance, and a communication device 17 that may receive data indicating traffic congestion.

The front radar device 3 may be attached, for example, at the center of the upper side of a front car license plate on the vehicle 2 and may include a radio wave transmitter and a radio wave receiver. The radio wave transmitter may radiate a radio wave to in front of the vehicle 2 and the radio wave, when reflected off an object in front of the vehicle 2 (e.g., another vehicle), may be received by the radio wave receiver. As a result, it is possible to detect a distance between the vehicle 2 and a vehicle ahead. It is also possible to detect a relative speed of the vehicle ahead on the basis of the strength and wavelength of the reflected wave.

The rear radar device 4 may be attached, for example, at the center of the upper side of a rear car license plate on the vehicle 2 and may include a radio wave transmitter and a radio wave receiver. The radio wave transmitter may radiate a radio wave from the rear of the vehicle 2 and the radio wave reflected off an object to the rear of the vehicle 2 (e.g., another vehicle) may be received by the radio wave receiver. As a result, it is be possible to detect a distance between the vehicle 2 and a vehicle behind the vehicle 2, as well as a relative speed of the other vehicle.

The vehicle speed sensor 5 may be a sensor for detecting a travel distance of the vehicle and/or the vehicle speed. The vehicle speed sensor 5 may produces a pulse according to a rotation of wheels of the vehicle 2 and outputs the pulse signal to the navigation ECU 11. The navigation ECU 11 may then calculates the rotational speed of the wheels and the travel distance by counting the pulses.

Next, each element of the navigation apparatus 6 will be described. The current position detecting section 12 may include a GPS 31, a geomagnetic sensor 32, a distance sensor 33, a steering sensor 34, a gyro sensor 35 that detects direction, and/or an altimeter (not shown), and may thus detect a position, a direction, and/or a distance to an object (for example, an intersection) in relation to the current vehicle 2.

Specifically, the GPS 31 may detect a current vehicle position of the vehicle 2 and a current time by receiving an electric wave provided by a satellite. The geomagnetic sensor 32 may detect a vehicle direction on the basis of measuring the earth's magnetic field. The distance sensor 33 may detect a distance between predetermined points on a road. For example, as the distance sensor 33, a sensor for measuring a rotational speed of vehicle wheels (not shown) and detecting a distance on the basis of the rotational speed and/or a sensor for measuring acceleration, integrating the acceleration twice, and determining the distance may be used.

The steering sensor 34 may detect a steering angle of the vehicle. For example, an optical rotation sensor or a rotation resistance sensor attached on a rotating part of a steering wheel (not shown), or an angle sensor attached to a wheel may be used as the steering sensor 34. The gyro sensor 35 may detect an angle of travel of the vehicle. For example, a gas-rate gyro or a vibration gyro may be used as the gyro sensor 35. Also, the direction of the vehicle may be detected by integrating the angle of travel detected by the gyro sensor 35.

The data storage section 13 may include, for example, a hard disk as an external storage device and as a storage medium. The data storage section 13 may store a map information database (DB) 22 and a link statistics DB 23 which are stored in the hard disk. Although, according to this example, a hard disk may be used as the external storage device and the storage media of the data storage section 13, a magnetic disk such as a flexible disk may be used as the external storage device instead. Further, a memory card, a magnetic tape, a magnetic drum, a CD, an MD, a DVD, an optical disc, an MO, an IC card, or an optical card may be used as the external storage device.

The navigation ECU 11 may include a CPU 41 as a calculating device and a control device for controlling the entire navigation apparatus 6. The navigation ECU 11 may include a RAM 42 as a working memory when the CPU 41 executes various types of calculations and for storing route data according to a searched route. The navigation ECU 11 may include a ROM 43 for storing a control program, a first traffic lane guidance processing program, and a second traffic lane guidance processing program. The navigation ECU 11 may include an internal storage device such as a flash memory 44 for storing a program read out from the ROM 43. Note that, a semiconductor memory or a magnetic core memory may be used as the RAM 42, the ROM 43, or the flash memory 44. Also, an MPU may be used as the calculating device and the control device instead of the CPU 41.

The first traffic lane guidance processing program may be a program for providing guidance regarding traffic lanes (e.g., a program that executes the exemplary method of FIG. 3), provided that predetermined conditions are met when the vehicle approaches a climbing lane or a lane for slower traffic within a predetermined distance.

The second traffic lane guidance processing program may be a program for providing guidance regarding traffic lanes (e.g., that executes the exemplary method FIG. 5), provided that predetermined conditions are met when the vehicle approaches a passing lane within a predetermined distance.

Although various programs may be stored in the ROM 43 and various data may be stored in the data storage section 13, programs and data may be read out from the same external storage device or a memory card and may be written on the flash memory 44, so that the programs and data may be updated by replacing the memory card.

The LCD display 14 may display, for example, an operation guidance, an operation menu, a key guidance, a route from a current position to a destination, guidance information along the route, traffic information, news, a weather report, date and time, e-mail, and/or TV programs. In particular, in the navigation apparatus 6, characters and/or symbols for providing guidance regarding a traffic lane when the vehicle approaches a passing lane, a climbing lane, or a lane for slower traffic within a predetermined distance may be displayed on the LCD display 14. Note that, a CRT display, a plasma display, or a hologram device for projecting hologram images on a windshield of the vehicle may be used instead of the LCD display 14.

The touch panel 15 may be attached on the front side of the LCD display 14. When the user touches the touch panel 15, the coordinates of the point where the user touched are specified and it may be determined where the user touched and what points the user touched after the initially touched point on the touch panel on the basis of the detected coordinates. Note that, a keyboard, a mouse, a remote control device, a joystick, a light pen, or a stylus pen may be used instead of the touch panel 15.

The speaker 16 may output audio guidance for traveling a route on the basis of the direction supplied from the navigation ECU 11. For example, the audio guidance may be "please turn right at XX intersection 300 m ahead" or "the climbing lane is coming up." In particular, in the navigation apparatus 6, an audio guidance regarding a traffic lane may be output when the vehicle approaches a passing lane, a climbing lane, or a lane for slower traffic within a predetermined distance. Note that the audio guidance output from the speaker 16 may be a synthetic voice sound, as well as various types of sound effects or various guidance information prerecorded on a tape or in a memory.

The communication device 17 may be a beacon receiver for receiving traffic information, for example, congestion information, regulation information, parking area information, and traffic accident information transferred from a traffic information center such as VICS® (Vehicle Information and Communication System) The information may be transmitted as an electric wave or an optical wave through an electric wave beacon device or an optical wave beacon device located along roads. As the communication device 17, for example, a network device for communicating through a network such as an LAN, a WAN, an intranet, a mobile phone line network, a telephone line network, a public communication network, a private communication network, or the Internet may be used. The communication device 17 may include an FM receiver, so that not only information from the information center, but also FM broadcast information such as news and a weather report may be received as an FM broadcast through an FM broadcast station. Note that, the beacon receiver and the FM receiver may be unitized and mounted as a VICS® receiver. However, the beacon receiver and the FM receiver may be mounted individually if needed.

In the map information DB 22, map data needed for route guidance and a map display may be stored. For example, map display data for displaying a map, intersection data, link data 24 regarding roads (road links), node data 25 regarding node points, search data for searching for a route, facility data regarding facilities, and/or detection data for detecting points may be included in the map information DB 22.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

As link data 24, data regarding road links forming roads, data regarding a corner, data regarding a road attribute, and/or data regarding a road type may be stored. The data regarding road links may include data indicating a width of a road formed by links, a grade, a cant, a bank, a condition of a road surface, the number of traffic lanes, a point where the number of traffic lanes decreases, a point where a road becomes narrow, and/or a crossing place. The data regarding corner may include data indicating a curvature radius, an intersection, a T-shaped intersection, and/or a start/end point of a corner. The data regarding road attributes may include data indicating a passing lane, a climbing lane, and a lane for slower traffic. The data regarding road type may include data indicating a national road, a prefectural road, a narrow street, a highway, an urban highway, a tollway, and/or a toll bridge. Further, according to such tollways, data regarding an entrance/exit of the tollways (a ramp way) and a tollbooth (an interchange) may be included. As link data for traffic lanes, data indicating a starting/ending point of a passing lane, a climbing lane, or a lane for slower traffic may be stored.

As node data 25, coordinates (position) of a node point such as a fork in a road (including an intersection and a T-shaped intersection) or points which are set on a road at intervals of a predetermined distance depending on a curvature radius of the road, a node attribute indicating whether a node is on an intersection, a connected link number list for listing link IDs of links which are connected to nodes, an adjoining node number list for listing node numbers of adjoining nodes of a link, and/or a height of a node point (altitude) may be stored.

Search data may be used for searching for a route to a set destination and displaying the route. For example, search data may include route display data for displaying a travel time necessary for passing through a link and a route selected by a route search on an LCD display 14. Cost data may also be included in search data. Cost data is used for calculating a search cost such as a cost necessary for passing through a node (hereinafter referred to as node cost) and a cost for a link forming a road (hereinafter referred to as link cost).

Node cost is basically set for a node at an intersection. In the navigation apparatus 6, a value of a node cost may be determined on the basis of, for example, an existence or nonexistence of a traffic light, a travel direction of the vehicle when the vehicle passes through an intersection (that is, a right/left turn at the intersection). Link cost may be determined on the basis of data regarding a road attribute, a road type, a width of a road, the number of traffic lanes on a link, and/or a length of a link.

As facility data, data regarding, for example, a hotel, a hospital, a gas station, a parking area, a sightseeing facility, an interchange, a restaurant, and/or a service area in various areas may be stored in association with facility IDs to specify such facilities. Note that, audio output data to output certain information from the speaker 16 of the navigation apparatus 6 may also be stored in the map information DB 22.

The above-described navigation apparatus 6 may search for a route from both sides, that is, from a starting point and from a destination, along links and nodes in map data. At the point where the search started from the starting point meets or overlaps with the search started from the destination, the search cost (the node cost and the link cost) accumulated from the starting point is added to the search cost accumulated from the destination point, that is, the total cost of the route is calculated. Then, a route with the minimum total cost may be set as the route for which guidance is to be given.

The link statistics DB 23 is a DB in which map data such as an average link travel time, an average vehicle speed, and/or a congestion degree for a plurality of links may be stored. The navigation ECU 11 may calculate a travel time necessary for traveling to a set destination and a predicted arrival time at the destination on the basis of the average link travel time stored in the link statistics DB 23. The navigation ECU 11 may further coordinate link costs for route searching on the basis of the traffic congestion degree. In the navigation system 1, before guidance regarding a climbing lane or a lane for slower traffic is provided, the navigation system 1 may compare the vehicle speed of the vehicle with the average vehicle speed on a link from the link statistics DB 23 and may determine whether the guidance regarding a traffic lane should be provided.

Data in the map information DB 22 and the link statistics DB 23 may be updated when information is transferred from a storage medium such as a DVD and/or an external device, for example, a memory card, or when information is downloaded from a specified information center through the communication device 17.

Next, an exemplary traffic lane guidance method will be described with reference to FIG. 3. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

The method may be executed at predetermined intervals (for example, at 4 m intervals) after the ignition switch of the vehicle is turned on. The method may provide guidance regarding a traffic lane when the vehicle approaches a climbing lane or a lane for slower traffic within a predetermined distance, provided that certain conditions are met. Note that, the method may be implemented as a program stored in the RAM 42 or the ROM 43 of the navigation apparatus 6 and executed by the CPU 41.

Figure 3:
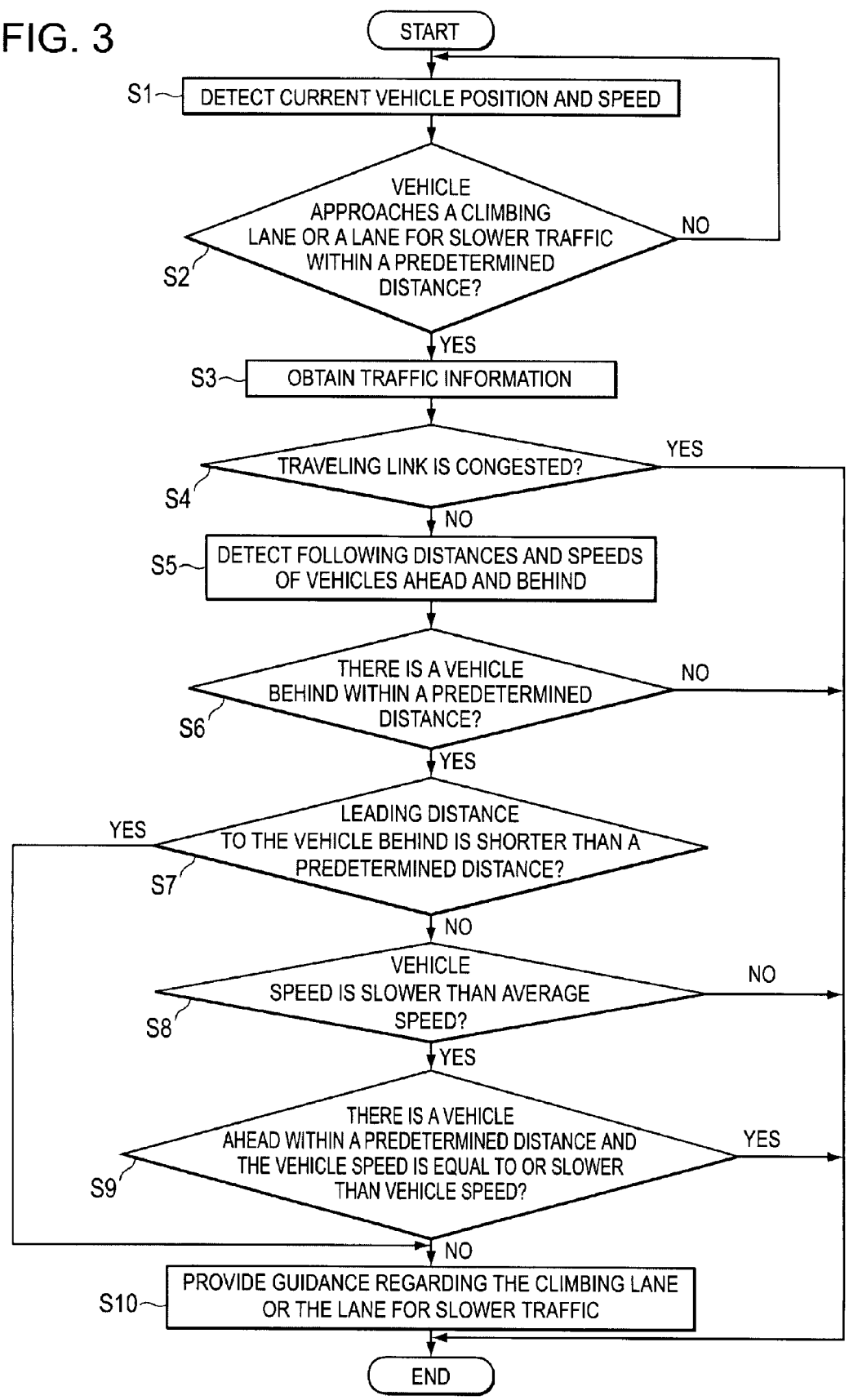
FIG. 3 is a flowchart showing an exemplary traffic lane guidance method.

As shown in FIG. 3, first, the CPU 41 may detect the current vehicle position and the travel direction by means of the current position detecting section 12 and the vehicle speed by counting pulses output from the vehicle speed sensor 5 (Step S1).

Then, the CPU 41 may determine whether the vehicle has approached a start point of a climbing lane or a lane for slower traffic within a predetermined distance (e.g., 500 m) on the basis of map data stored in the map information DB 22 (Step S2).

Figure 4:
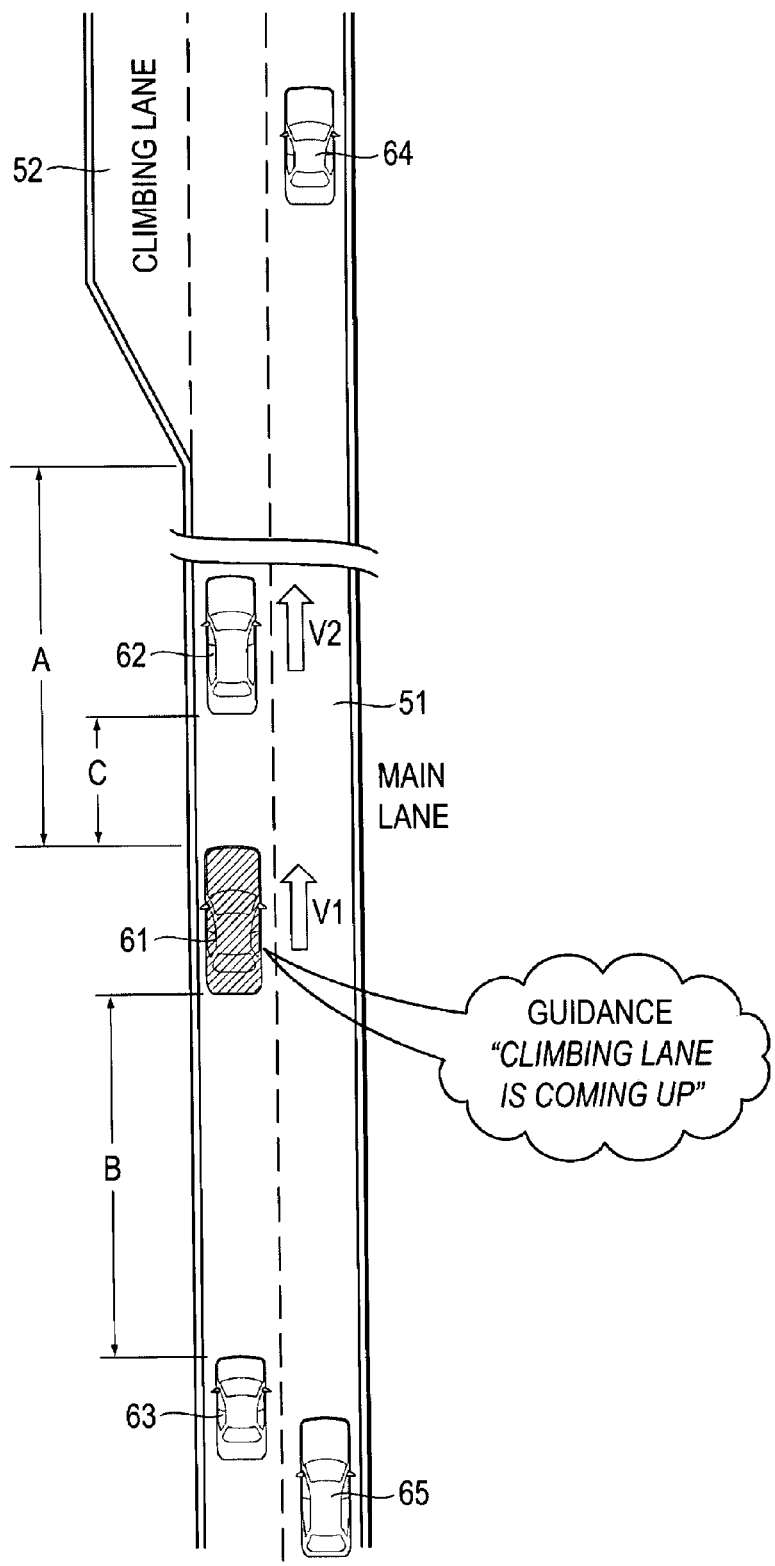
FIG. 4 is a diagram showing positional relationships between a vehicle that is traveling from a main lane to a climbing lane and vehicles that are traveling around the vehicle.

FIG. 4 is a diagram showing a positional relationship between a vehicle 61, which is traveling from a main lane 51 to a climbing lane 52, and other vehicles 62 through 65, which are traveling around the vehicle 61, at a given time. Thus, for example, in Step S2, it may be determined whether a distance A between the starting point of the climbing lane 52 and the vehicle 61 is equal to or less than a predetermined distance (e.g., 500 m).

When it is determined that the vehicle is more than the predetermined distance away from the starting point of the climbing lane or the lane for slower traffic (Step S2=NO), a current vehicle position is detected again (return to Step S1). When it is determined that the vehicle has approached the starting point of the climbing lane or the lane for slower traffic within the predetermined distance (Step S2=YES), the CPU 41 obtains traffic information from, for example, the traffic information center through the communication device 17 (Step S3). Note that, traffic information obtained may include congestion information, in particular, for specifying a congestion condition of a link.

Next, the CPU 41 determines whether a link in which the vehicle is currently traveling is congested based on the obtained traffic information (Step S4). When it is determined that the link is congested (Step S4=YES), it is likely that the driver of the vehicle cannot change traffic lanes even if guidance regarding the climbing lane or the lane for slower traffic were provided. Therefore, no guidance is provided no matter how long or short a following/leading distance to a vehicle ahead/behind is. Thus, the method is terminated.

When it is determined that the link is not congested based on the obtained traffic information (Step S4=NO), the following distance to and the relative speed of the vehicle ahead are detected based on the detection by the front radar device 3 and the leading distance from and the relative speed to the vehicle behind are detected based on the detection by the rear radar device 4 (Step S5). Specifically, as exemplified in FIG. 4, the following distances or leading distance and the relative speeds for both of the vehicle ahead 62 and the vehicle behind 63 may be detected.

Next, the CPU 41 determines whether another vehicle is located to the rear of the vehicle within a predetermined distance (e.g., within 100 m) based on the detected distance (Step S6). Specifically, as exemplified in FIG. 4, it is determined whether the leading distance B between the vehicle 61 and the vehicle behind 63 is equal to or less than a predetermined distance (e.g., 100 m).

When it is determined that there is no vehicle to the rear of the vehicle within a predetermined distance (Step S6=NO), it is likely that the vehicle is not obstructing other vehicles and that the vehicle does not need to change the traveling traffic lane to a climbing lane or a lane for slower traffic. Therefore, guidance regarding the approaching traffic lane is not provided and the method is terminated.

When it is determined that another vehicle is located to the rear of the vehicle within a predetermined distance (Step S6=YES), it is further determined whether the distance between the vehicle and the vehicle behind is less than a predetermined distance. The predetermined distance may depend on the vehicle speed (e.g., 30 m if the vehicle is traveling at 30 km/h)) (Step S7). Specifically, as exemplified in FIG. 4, it is determined whether the leading distance B between the vehicle 61 and the vehicle behind 63 is less than a predetermined distance.

When it is determined that the leading distance to the vehicle behind is shorter than a predetermined distance (Step S7=YES), it is likely that the vehicle should change the traveling traffic lane to the climbing lane or the lane for slower traffic so as not to obstruct the approaching vehicle behind. Therefore, the CPU 41 provides guidance regarding the climbing lane or the lane for slower traffic (Step S10). Specifically, an audio guidance such as "a climbing lane (or a lane for slower traffic) is coming up" may be output from the speaker 16 and characters or a symbol indicating the approach of the climbing lane or the lane for slower traffic may be displayed on the LCD display 14. Thus, a user may easily recognize the approach of the climbing lane or the lane for slower traffic when it is likely that it will be used.

When it is determined that the leading distance to the vehicle behind is greater than a predetermined distance (Step S7=NO), it is further determined whether the detected vehicle speed is less than an average speed of a link in which the vehicle is currently traveling stored in the link statistics DB 23 (Step S8). When it is determined that the vehicle speed is greater than the average speed of the link in which the vehicle is currently traveling (Step S8=NO), it is likely that the vehicle does not need to change the traveling traffic lane to the climbing lane or the lane for slower traffic because the vehicle may not be obstructing the vehicle behind as long as the vehicle keeps its current speed. Therefore, the method is terminated without providing guidance regarding traffic lanes.

When it is determined that the vehicle speed is less than the average speed of the link in which the vehicle is currently traveling (Step S8=YES), the CPU 41 determines whether another vehicle is located in front of the vehicle within a predetermined distance (e.g., within 100 m) based on the detected distance and further determines whether the speed of the vehicle in front of the vehicle is equal to or less than the detected vehicle speed (Step S9). Specifically, as exemplified in FIG. 4, it is determined whether a following distance C between the vehicle ahead 62 and the vehicle 61 is equal to or less than a predetermined distance (e.g., 100 m) and whether the vehicle speed V2 of the vehicle ahead 62 is equal to or less than the vehicle speed V1 of the vehicle 61.

When it is determined that another vehicle is located in front of the vehicle within a predetermined distance and that the speed of the vehicle ahead is equal to or less than the vehicle speed (Step S9=YES), it is likely that the traffic on the link is slow and that the vehicle does not need to change the traveling traffic lane to the climbing lane or the lane for slower traffic because the vehicle itself is not causing the obstruction to vehicles to the rear of itself as long as the vehicle keeps its current speed. Therefore, the method is terminated without providing guidance regarding a traffic lane.

When there is no vehicle in front of the vehicle within a predetermined distance or even if another vehicle is located in front of the vehicle within a predetermined distance, when the speed of the vehicle ahead is greater than the vehicle speed (Step S9=NO), it is likely that the vehicle should change the traveling traffic lane to the climbing lane or the lane for slower traffic so as not to obstruct a vehicle to the rear of the vehicle. Therefore, the CPU 41 provides guidance regarding the climbing lane or the lane for slower traffic to the user (Step S10).

Next, an exemplary traffic lane guidance method will be described with reference to FIG. 5. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

The method may be executed at predetermined intervals (e.g., at 4 m intervals) after the ignition switch of the vehicle is turned on and may provide guidance regarding a traffic lane if the vehicle approaches a passing lane within a predetermined distance and if certain conditions met. Note that, the method may be implemented as a program stored in the RAM 42 or the ROM 43 of the navigation apparatus 6 and executed by the CPU 41.

Figure 5:
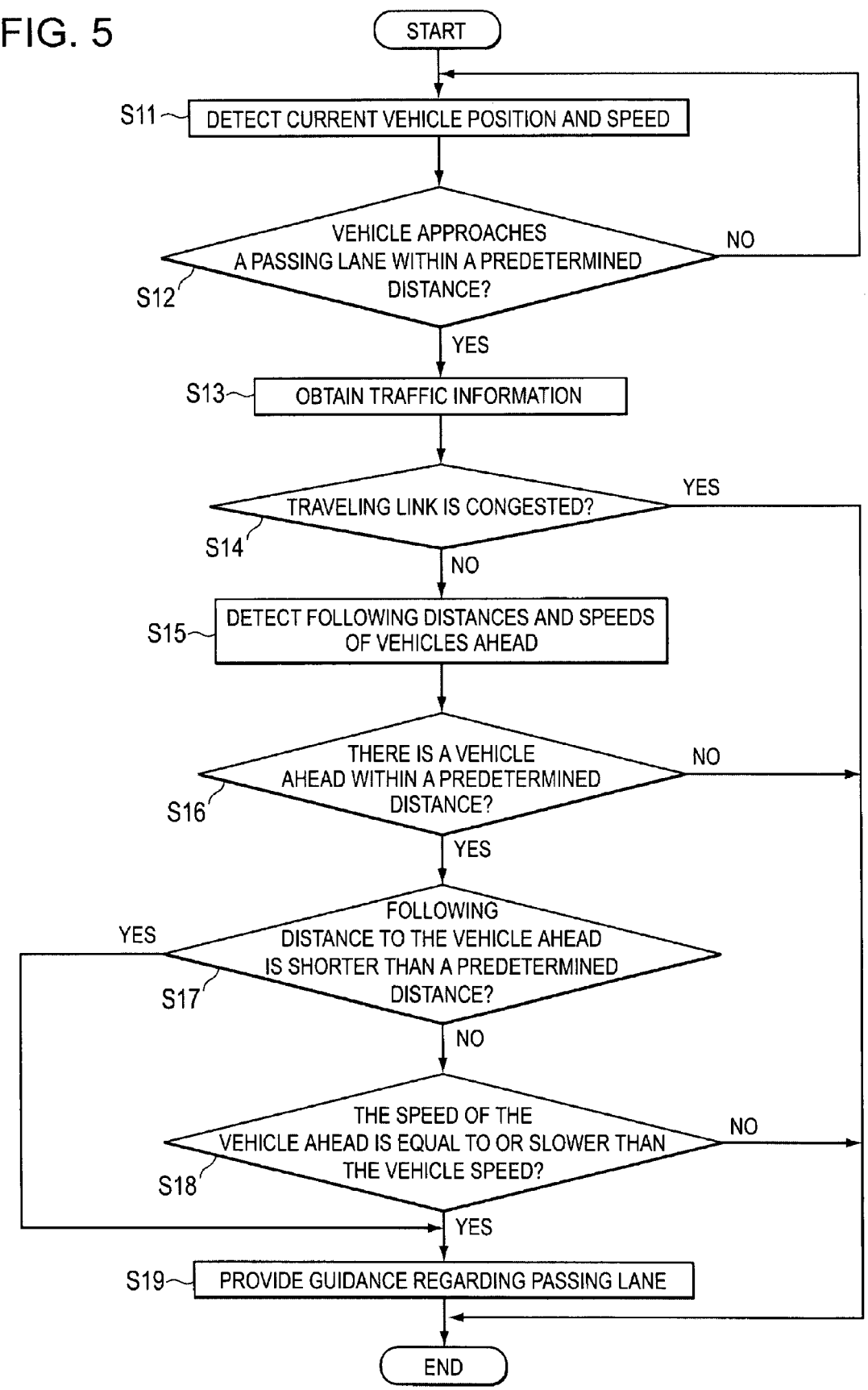
FIG. 5 is a flowchart showing an exemplary traffic lane guidance method.

As shown in FIG. 5, first, the CPU 41 detects the current vehicle position and the travel direction by the current position detecting section 12 and further detects the vehicle speed by counting pulses output from the vehicle speed sensor 5 (Step S11).

Next, the CPU 41 determines whether the vehicle has approached a start point of a passing lane within a predetermined distance (e.g., 500 m) based on the detected current vehicle position and map data stored in the map information DB 22 (Step S12).

Figure 6:
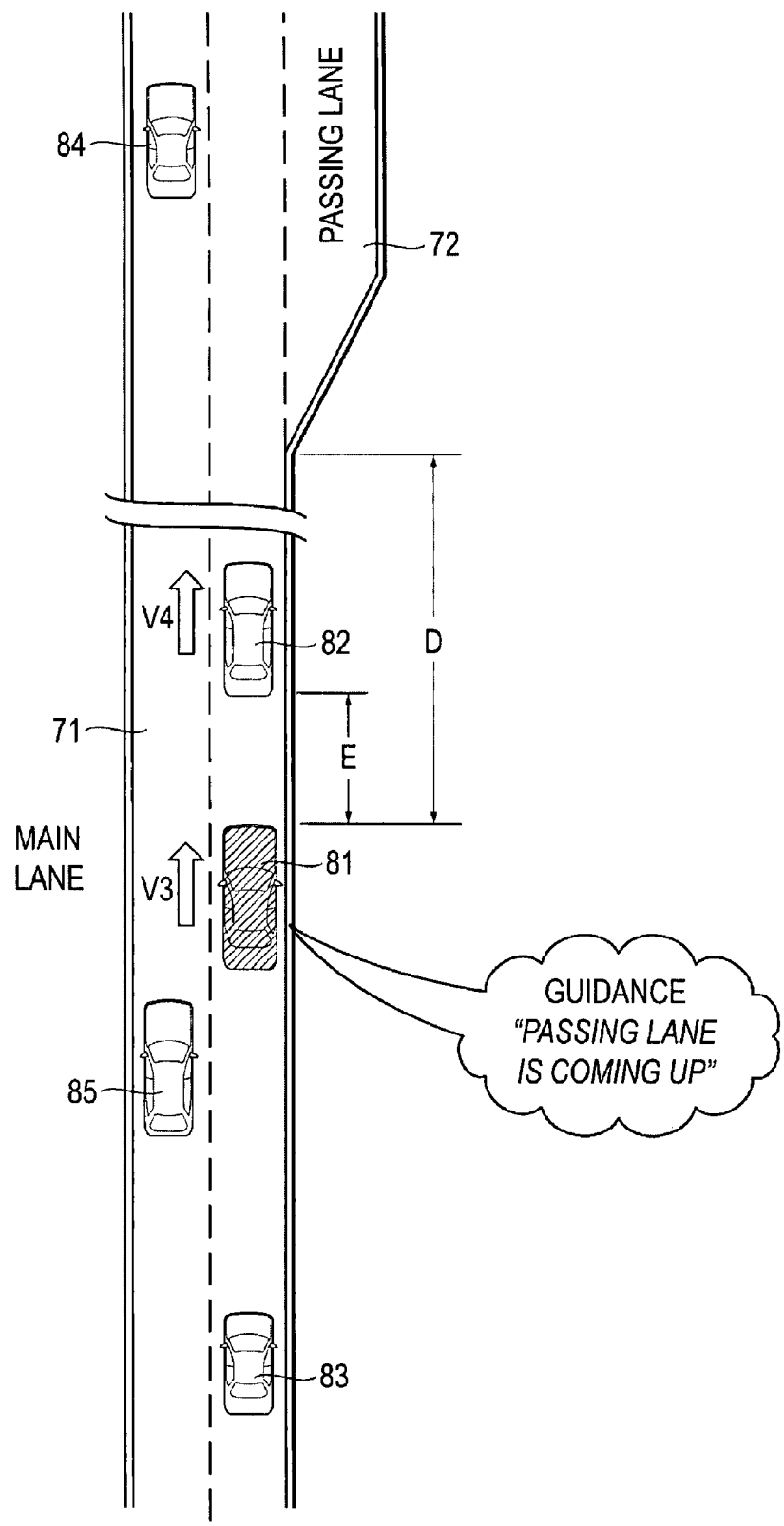
FIG. 6 is a diagram showing positional relationships between a vehicle that is traveling from a main lane to a passing lane and vehicles that are traveling around the vehicle.

FIG. 6 is a diagram showing a positional relationship between a vehicle 81, which is traveling from a main lane 71 to a passing lane 72, and other vehicles 82 through 85, which are traveling around the vehicle 81, at a given time. Thus, for example, it is determined whether a distance D between the starting point of the passing lane 72 and the vehicle 81 is equal to or less than a predetermined distance (e.g., 500 m).

When it is determined that the vehicle is more than the predetermined distance away from the starting point of the passing lane (Step S12=NO), a current vehicle position is detected again (return to Step S11). When it is determined that the vehicle approached the starting point of the passing lane within the predetermined distance (Step S12=YES), the CPU 41 obtains traffic information from, for example, the traffic information center through the communication device 17 (Step S13). Note that, the obtained traffic information may include congestion information especially for specifying a congestion condition of a link.

Next, the CPU 41 determines whether a link on which the vehicle is currently traveling is congested based on the obtained traffic information (Step S14). When it is determined that the link is congested (Step S14=YES), it is likely that the driver of the vehicle can not change traffic lanes even if guidance regarding the passing lane is provided. Therefore, no guidance is provided no matter how long or short following/leading distances to other vehicles ahead and behind are, and the method is terminated.

When it is determined that the link is not congested (Step S14=NO), following distance and the relative speed to the vehicle ahead are detected based on the detection by the front radar device 3. Specifically, as exemplified in FIG. 6, the following distance and the relative speed to the vehicle 82, which is in front of the vehicle 81, are detected.

Next, the CPU 41 determines whether another vehicle is located in front of the vehicle within a predetermined distance (e.g., within 100 m) based on the detected distance (Step S16). Specifically, as exemplified in FIG. 6, it is determined whether the following distance E between the vehicle 81 and the vehicle ahead 82 is equal to or less than a predetermined distance (e.g., 100 m).

When it is determined that there is no vehicle in front of the vehicle within the predetermined distance (Step S16=NO), it is likely that the travel of the vehicle will be not obstructed by other vehicles and that the vehicle does not need to change the traveling traffic lane to the passing lane. Therefore, the method is terminated without providing guidance regarding traffic lane.

When it is determined that another vehicle is located in front of the vehicle within a predetermined distance (Step S16=YES), it is further determined whether the distance between the vehicle and the vehicle ahead of the vehicle is less than a predetermined distance. The predetermined distance may depend on the vehicle speed (e.g., 30 m if the vehicle travels at 30 km/h)) (Step S17). Specifically, as exemplified in FIG. 6, it is determined whether the following distance E between the vehicle 81 and the vehicle ahead 82 is shorter than a predetermined distance.

When it is determined that the following distance to the vehicle ahead is shorter than the predetermined distance (Step S17=YES), it is likely that the vehicle should change the traveling traffic lane to the passing lane so that the vehicle will not be obstructed by the vehicle ahead. Therefore, the CPU 41 provides guidance regarding the passing lane (Step S19). Specifically, an audio guidance such as "the passing lane is coming up" may be output from the speaker 16 and/or characters or a symbol indicating the approach of the passing lane may be displayed on the LCD display 14. Thus, the user may easily recognize the approach of the passing lane when it is likely that it will be used.

When it is determined that the following distance to the vehicle ahead is longer than the predetermined distance (Step S17=NO), it is further determined whether the speed of the vehicle ahead is equal to or slower than the vehicle speed based on the result of the detected speed of the vehicle ahead (Step S18). Specifically, as exemplified in FIG. 6, it is determined whether the speed V4 of the vehicle ahead 82 is equal to or slower than the speed V3 of the vehicle 81.

When it is determined that the speed of the vehicle ahead is equal to or slower than the vehicle speed (Step S18=YES), it is likely that the vehicle will change the traveling traffic lane to the passing lane because the vehicle ahead may possibly obstruct the vehicle. Therefore, the CPU 41 provides guidance regarding the passing lane to the user (Step S19).

When it is determined that the speed of the vehicle ahead is faster than the vehicle speed (Step S18=NO), it is likely that the vehicle will not need to change the traveling traffic lane to the passing lane because the vehicle ahead will not obstruct the vehicle. Therefore, the method is terminated without providing guidance regarding traffic lane.

According to the above examples, it is possible to provide guidance regarding a climbing lane or a lane for slower traffic when needed based on positional relationships between the vehicle and other vehicles around the vehicle and the relative speeds between the vehicle and other vehicles around the vehicle. Furthermore, it is possible to provide guidance regarding the passing lane when needed based on positional relationships between the vehicle and other vehicles around the vehicle and the relative speeds between the vehicle and other vehicles around the vehicle. When it is likely that no guidance is needed, unnecessary guidance regarding traffic lanes is not provided and the driver may concentrate on driving, without being annoyed by unnecessary guidance. Furthermore, by providing guidance regarding traffic lanes only when it is likely that it will be needed, a data processing burden on the navigation system 1 is reduced.

However, when the vehicle should change the traveling traffic lane to the climbing lane or the lane for slower traffic to avoid obstructing the vehicle in the rear of the vehicle, suitable guidance may be provided to the vehicle and it may increase convenience of the user.

Furthermore according to the above examples, when it is likely that the driver cannot change or would like to avoid changing traffic lanes (e.g., due to heavy traffic), unnecessary traffic lane guidance can be avoided. As a result, the driver may concentrate on driving and a data processing burden on the navigation system 1 can be reduced.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, according to the current embodiment, the front radar device 3 and the rear radar device 4 detect following/leading distances to a vehicle ahead or to a vehicle behind and relative speeds to such vehicles. However, a camera for imaging an area surrounding the vehicle may be attached on the vehicle instead of or in addition to the radar devices 3, 4. Thus, it may be possible to detect following/leading distances and/or relative speeds based on images obtained by the camera. It may also be possible to detect following/leading distances and/or relative speeds by receiving communications from the other vehicles.

What is claimed is:

1. A navigation system for a vehicle, comprising:
   a memory that stores map data including starting points for each of the following special purpose lanes:
      passing lanes, which are lanes that are specifically designated within the map data as being used for vehicles to pass other slower vehicles;
      climbing lanes, which are lanes that are specifically designated within the map data as being used for vehicles to move slowly uphill; and
      lanes for slower traffic, which are lanes that are specifically designated within the map data as being used for vehicles to move more slowly than vehicles in adjacent lanes;
   a vehicle position detector that detects a current position of the vehicle;
   a receiver for receiving traffic congestion information; and
   a controller that:
      determines whether the vehicle is within a predetermined distance of an approaching one of the stored starting points based on the detected current vehicle position and the map data;
      determines whether a link in which the vehicle is currently traveling is congested based on the received traffic congestion information;
      if the vehicle is within the predetermined distance of the approaching starting point, provides guidance regarding a passing lane, a climbing lane, or a lane for slower traffic corresponding to the approaching starting point based on a distance to another vehicle detected by a distance detector mounted on the vehicle; and
      does not provide the guidance regarding the corresponding passing lane, climbing lane, or lane for slower traffic if it is determined that the link in which the vehicle is currently traveling is congested.

2. The navigation system of claim 1, further comprising the distance detector.

3. The navigation system of claim 1, further comprising:
   a vehicle speed detector that detects a speed of the vehicle;
   wherein the controller provides the guidance regarding the corresponding passing lane, climbing lane, or lane for slower traffic based on the detected distance to the other vehicle and the detected vehicle speed.

4. The navigation system of claim 1, wherein, if the vehicle is within the predetermined distance of the corresponding climbing lane or lane for slower traffic, the controller:
   determines whether the detected distance to the other vehicle is within a predetermined leading distance behind the vehicle; and
   provides the guidance regarding the corresponding climbing lane or lane for slower traffic when the detected distance to the other vehicle is within the predetermined leading distance behind the vehicle.

5. The navigation system of claim 4, further comprising:
   a vehicle speed detector that detects a speed of the vehicle; and
   another vehicle speed detector that detects a speed of the other vehicle;
   wherein the controller does not provide the guidance regarding the corresponding climbing lane or lane for slower traffic if the speed of the other vehicle is less than the speed of the vehicle.

6. The navigation system of claim 1, wherein, if the vehicle is within the predetermined distance of the passing lane, the controller:
   determines whether the detected distance to the other vehicle is within a predetermined following distance ahead of the vehicle; and
   provides the guidance regarding the corresponding passing lane when the detected distance to the other vehicle is within the predetermined following distance ahead of the vehicle.

7. The navigation system of claim 6, further comprising:
   a vehicle speed detector that detects a speed of the vehicle; and
   another vehicle speed detector that detects a speed of the other vehicle;
   wherein the controller does not provide the guidance regarding the corresponding passing lane if the speed of the other vehicle is more than the speed of the vehicle.

8. A navigation system for a vehicle, comprising:
   a memory that stores map data including starting points for each of the following special purpose lanes:
      passing lanes, which are lanes that are specifically designated within the map data as being used for vehicles to pass other slower vehicles;
      climbing lanes, which are lanes that are specifically designated within the map data as being used for vehicles to move slowly uphill; and
      lanes for slower traffic, which are lanes that are specifically designated within the map data as being used for vehicles to move more slowly than vehicles in adjacent lanes;
   a vehicle position detector that detects a current position of the vehicle;
   a receiver for receiving traffic congestion information; and
   a controller that:
      determines whether the vehicle is within a predetermined distance of an approaching one of the stored starting points based on the detected current vehicle position and the map data;
      determines whether a link in which the vehicle is currently traveling is congested based on the received traffic congestion information;
      if the vehicle is within the predetermined distance of the approaching starting point, provides guidance regarding a passing lane, a climbing lane, or a lane for slower traffic corresponding to the approaching starting point based on a speed of another vehicle detected by another vehicle speed detector mounted on the vehicle; and does not provide the guidance regarding the corresponding passing lane, climbing lane, or lane for slower traffic if it is determined that the link in which the vehicle is currently traveling is congested.

9. The navigation system of claim 8, further comprising the other vehicle speed detector.

10. The navigation system of claim 8, wherein:
the other vehicle is in front of the vehicle;
the controller determines whether the other vehicle is traveling equal to or less than a speed of the vehicle; and
the controller does not provide the guidance regarding the corresponding climbing lane or lane for slower traffic if the other vehicle is traveling equal to or less than the speed of the vehicle.

11. The navigation system of claim 8, wherein:
the other vehicle is in front of the vehicle;
the controller determines whether the other vehicle is traveling faster than a speed of the vehicle; and
the controller does not provide the guidance regarding the corresponding passing lane if the other vehicle is traveling faster than the speed of the vehicle.

12. A navigation system for a vehicle, comprising:
a memory that stores map data including starting points for each of the following special purpose lanes:
passing lanes, which are lanes that are specifically designated within the map data as being used for vehicles to pass other slower vehicles;
climbing lanes, which are lanes that are specifically designated within the map data as being used for vehicles to move slowly uphill; and
lanes for slower traffic, which are lanes that are specifically designated within the map data as being used for vehicles to move more slowly than vehicles in adjacent lanes;
a vehicle position detector that detects a current position of the vehicle;
a receiver for receiving traffic congestion information; and
a controller that:
determines whether the vehicle is within a predetermined distance of an approaching one of the stored starting points based on the detected current vehicle position and the map data;
if the vehicle is within the predetermined distance of the approaching starting point, provides guidance regarding a passing lane, a climbing lane, or a lane for slower traffic corresponding to the approaching starting point based on the received traffic congestion information; and
does not provide the guidance regarding the corresponding passing lane, climbing lane, or lane for slower traffic if a link in which the vehicle is currently traveling is congested.

13. A navigation system for a vehicle, comprising:
a memory that stores:
map data including starting points for each of the following special purpose lanes:
climbing lanes, which are lanes that are specifically designated within the map data as being used for vehicles to move slowly uphill; and
lanes for slower traffic, which are lanes that are specifically designated within the map data as being used for vehicles to move more slowly than vehicles in adjacent lanes; and
average vehicle speeds for links in the roadway network;
a vehicle position detector that detects a current position of the vehicle; and
a controller that:
determines whether the vehicle is within a predetermined distance of an approaching one of the stored starting points based on the detected current vehicle position and the map data;
determines a link that the vehicle is currently traveling on based on the detected current vehicle position and the map data;
accesses an average vehicle speed for the currently traveled link from the stored average vehicle speeds;
accesses a current speed of the vehicle;
determines a speed of another vehicle detected by another vehicle speed detector mounted on the vehicle;
if the vehicle is within the predetermined distance of the approaching starting point, provides guidance regarding a climbing lane or a lane for slower traffic corresponding to the approaching starting point; and
does not provide the guidance regarding the corresponding climbing lane or lane for slower traffic if the accessed current speed of the vehicle is less than the accessed average vehicle speed for the currently traveled link and the speed of the other vehicle is less than the accessed current speed of the vehicle.

* * * * *